United States Patent
Kajiyama et al.

(10) Patent No.: US 11,492,266 B2
(45) Date of Patent: Nov. 8, 2022

(54) PROCESSES FOR PREPARING POSITIVE ELECTRODE ACTIVE SUBSTANCE FOR NON-AQUEOUS ELECTROLYTE SECONDARY BATTERIES

(71) Applicant: TODA KOGYO CORP., Hiroshima (JP)

(72) Inventors: Akihisa Kajiyama, Onoda (JP); Ryuta Masaki, Onoda (JP); Tsuyoshi Wakiyama, Onoda (JP); Tetsuya Kashima, Onoda (JP); Shoichi Fujino, Onoda (JP); Osamu Sasaki, Onoda (JP); Kazutoshi Matsumoto, Onoda (JP)

(73) Assignee: TODA KOGYO CORP., Hiroshima (JP)

( * ) Notice: Subject to any disclaimer, the term of this patent is extended or adjusted under 35 U.S.C. 154(b) by 331 days.

(21) Appl. No.: 16/663,546

(22) Filed: Oct. 25, 2019

(65) Prior Publication Data

US 2020/0058934 A1    Feb. 20, 2020

Related U.S. Application Data

(62) Division of application No. 15/550,874, filed as application No. PCT/JP2016/054278 on Feb. 15, 2016, now abandoned.

(30) Foreign Application Priority Data

Feb. 17, 2015 (JP) .................................. 2015-029055

(51) Int. Cl.
| | | |
|---|---|---|
| C01G 51/00 | (2006.01) | |
| H01M 4/525 | (2010.01) | |
| C01G 53/00 | (2006.01) | |
| C01G 45/12 | (2006.01) | |
| H01M 4/505 | (2010.01) | |
| H01M 4/04 | (2006.01) | |
| H01M 10/0525 | (2010.01) | |
| H01M 4/02 | (2006.01) | |

(52) U.S. Cl.
CPC ......... *C01G 51/44* (2013.01); *C01G 45/1228* (2013.01); *C01G 53/006* (2013.01); *C01G 53/50* (2013.01); *H01M 4/0471* (2013.01); *H01M 4/505* (2013.01); *H01M 4/525* (2013.01); *H01M 10/0525* (2013.01); *C01P 2004/61* (2013.01); *H01M 2004/028* (2013.01)

(58) Field of Classification Search
CPC .... C01G 51/50; C01G 45/1228; C01G 53/50; H01M 4/0471; H01M 4/505; H01M 4/525; H01M 10/0525
See application file for complete search history.

(56) References Cited

U.S. PATENT DOCUMENTS 6,395,250 B2    5/2002 Matsubara et al.

FOREIGN PATENT DOCUMENTS

| CN | 102447097 | 5/2012 |
|---|---|---|
| JP | 2002-151071 | 5/2002 |
| JP | 2004-311427 | 11/2004 |
| JP | 2007-317576 | 12/2007 |
| JP | 2010-47466 | 3/2010 |
| JP | 2012-28163 | 2/2012 |
| JP | 2014-149962 | 8/2014 |
| JP | 2015-18678 | 1/2015 |
| JP | 2015-118801 | 6/2015 |
| WO | WO 2015/182665 | 12/2015 |

OTHER PUBLICATIONS

Translation of JP-2010-047466. (Year: 2010).*
Meng et al. "Synthesis and electrochemical property of $LiNi_{1/3}Co_{1/3}Mm_{1/3}O_2$ cathodes in lithium-ion and all-solid state lithium batteries", Ionics (2015) 21:43-49.
Extended European Search Report in Application No. 16752428.9 dated Jul. 6, 2018.
International Search Report issued in PCT/JP2016/054278 dated Apr. 5, 2016.
International Preliminary Report on Patentability issued in PCT/JP2016/054278 dated Aug. 22, 2017.

* cited by examiner

*Primary Examiner* — Steven J Bos
(74) *Attorney, Agent, or Firm* — Nixon & Vanderhye P.C.

(57) ABSTRACT

Provided herein are processes for producing positive electrode active substance particles for non-aqueous electrolyte secondary batteries which is excellent in life characteristics of a battery with respect to a repeated charging and discharging performance thereof, as well as a non-aqueous electrolyte secondary battery. In particular, provided herein are processes for producing a positive electrode active substance for non-aqueous electrolyte secondary batteries comprising lithium transition metal layered oxide having a composition represented by the formula: $Li_a(Ni_xCo_yMn_{1-x-y})O_2$ wherein a is 1.0≤a≤1.15; x is 0<x<1; and y is 0<y<1, in which the positive electrode active substance is in the form of secondary particles formed by aggregating primary particles thereof, and a coefficient of variation of a compositional ratio: Li/Me wherein Me is a sum of Ni, Co and Mn as measured on a section of the secondary particle is not more than 25%.

6 Claims, 1 Drawing Sheet

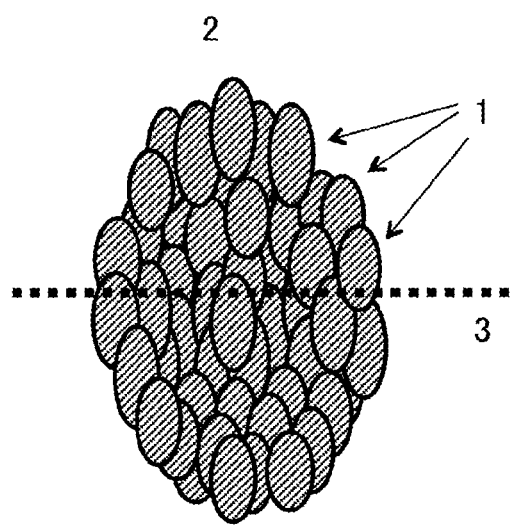

PROCESSES FOR PREPARING POSITIVE ELECTRODE ACTIVE SUBSTANCE FOR NON-AQUEOUS ELECTROLYTE SECONDARY BATTERIES

PRIOR APPLICATIONS

This application is a divisional of U.S. application Ser. No. 15/550,874 filed Aug. 14, 2017, which is the U.S. national phase of International Application No. PCT/JP2016/054278 filed Feb. 15, 2016 which designated the U.S. and claims priority to JP Patent Application No. 2015-29055 filed Feb. 17, 2015, the entire contents of each of which are hereby incorporated by reference.

TECHNICAL FIELD

The present invention relates to a positive electrode (cathode) active substance for non-aqueous electrolyte secondary batteries, and more particularly, to a positive electrode active substance that is capable of conducting stable charging and discharging operations without significant deterioration in characteristics thereof even when subjected to repeated charging and discharging cycles.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric cars and hybrid cars have been recently developed and put into practice, so that there is an increasing demand for lithium ion secondary batteries for large size applications which exhibit excellent durability. Under these circumstances, the lithium ion secondary batteries that are excellent in service life when subjected to repeated charging and discharging cycles as well as high output characteristics have been noticed.

As the method of meeting the aforementioned needs, there has been usually used the method of controlling an interface reaction between an electrode active substance and an electrolyte solution in association with insertion and desorption of lithium ions upon charging and discharging operations. An example of the method is the method of subjecting the active substance to various surface treatments, and the advantageous effects of the surface treatments have also been validated.

In addition, for the purpose of improving output characteristics and durability of the active substance, the method of atomizing crystallites of the active substance and designing a particle form of the active substance in the form of secondary particles constituted of an aggregate of the crystallites as a behaving unit thereof has become predominant and actually exhibited good effects. However, the active substance that acts in the form of the secondary particles as a behaving unit thereof tends to still have peculiar problems to be improved such as degradation of the aggregated form during charging and discharging cycles, i.e., occurrence of cracks in the behaving particles around a grain boundary thereof. The occurrence of cracks in the particles tends to induce reduction in conductive path or deterioration in electrode density, and further induce rapid deterioration in battery characteristics. Therefore, in order to further improve performance of the battery, it is necessary to overcome such a problem that characteristics of the active substance are gradually deteriorated owing to the separation along a crystal interface thereof, etc.

As an example of the conventional particles acting in the form of secondary particles as a behaving unit in which attention is paid to the control of a composition of the crystal grain boundary formed inside the behaving unit of the aggregate-based active substance, there has been present such a report that a coating film is formed even on a crystal interface inside the aggregated particles.

For example, as a positive electrode active substance formed of a Ni-containing layered oxide, there are mentioned those active substances in which Ti is allowed to be present along a grain boundary thereof (Patent Literature 1), those active substances in which Nb is allowed to be present along a grain boundary thereof (Patent Literature 2), those active substances in which at least one element selected from the group consisting of Ti, Zr, Hf, Si, Ge and Sn is allowed to be present along a grain boundary thereof (Patent Literature 3) and the like.

As a result of the present inventors' study on designing of compositions of these grain boundaries, it has been found that only by allowing the different kinds of compounds to be present along the grain boundary, it is difficult to sufficiently improve properties of the active substances, and deposition of an Li component as a raw material of the active substance on the grain boundary rather tends to occur so that a service life of the resulting battery is shortened. Meanwhile, the deposition of the Li component is caused by local segregation of Li due to addition of a surplus amount of Li or poor mixing of the raw materials upon synthesis of the active substance, or thermal decomposition of the active substance owing to reduction of Ni during calcination thereof.

In the present invention, special attention has been paid to the aforementioned composition of the grain boundary, in particular, the surplus Li component therein, and the present invention aims at inhibiting formation and growth of resistive components in the grain boundary which are formed due to the surplus Li component, as well as obtaining a battery having high output characteristics and prolonged service life.

CITATION LIST

Patent Literature

Patent Literature 1: Japanese Patent Application Laid-open (KOKAI) No. 2012-28163
Patent Literature 2: Japanese Patent Application Laid-open (KOKAI) No. 2002-151071
Patent Literature 3: Japanese Patent Application Laid-open (KOKAI) No. 2007-317576

SUMMARY OF INVENTION

Technical Problem

The present invention provides a positive electrode active substance used in non-aqueous electrolyte secondary batteries, and more specifically, a material capable of meeting continuously increasing requirements for a quality thereof, in particular, a material capable of improving life characteristics of the battery with respect to repeated charging and discharging performance.

That is, by utilizing only technologies of the aforementioned Patent Literatures 1 to 3, it may be difficult to obtain an electrode that is capable of conducting stable charging and discharging operations without significant deterioration in characteristics thereof when subjected to repeated charging and discharging cycles.

In addition, the Patent Literatures 1 to 3 fail to specifically describe the variation of a concentration of Li in the grain boundary and crystals.

In the present invention, special attention has been paid to the composition of the grain boundary, in particular, the surplus Li component therein, and the present invention aims at inhibiting formation and growth of resistive components in the grain boundary which are formed due to the surplus Li component, as well as obtaining a battery having high output characteristics and prolonged service life. Thus, the object or technical task of the present invention is to provide a positive electrode active substance that is capable of conducting stable charging and discharging operations without significant deterioration in characteristics thereof even when subjected to repeated charging and discharging cycles.

Solution to Problem

That is, according to the present invention, there is provided a positive electrode active substance for non-aqueous electrolyte secondary batteries comprising lithium transition metal layered oxide having a composition represented by the formula:

$$Li_a(Ni_xCo_yMn_{1-x-y})O_2$$

wherein a is not less than 1.0 and not more than 1.15 ($1.0 \leq a \leq 1.15$); x is more than 0 and less than 1 ($0 < x < 1$); and y is more than 0 and less than 1 ($0 < y < 1$), in which the positive electrode active substance is in the form of secondary particles formed by aggregating primary particles thereof, and a coefficient of variation of a compositional ratio: Li/Me wherein Me is a sum of Ni, Co and Mn (Me=Ni+Co+Mn) as measured on a section of the secondary particle is not more than 25% (Invention 1).

Also, according to the present invention, there is provided the positive electrode active substance for non-aqueous electrolyte secondary batteries as defined in the above Invention 1, wherein an average secondary particle diameter of the active substance is 3.0 to 16 μm (Invention 2).

Also, according to the present invention, there is provided the positive electrode active substance for non-aqueous electrolyte secondary batteries as defined in the above Invention 1 or 2, wherein an average particle diameter (crystallite size) of primary particles of the active substance is 100 to 600 nm (Invention 3).

In addition, according to the present invention, there is provided a non-aqueous electrolyte secondary battery using the positive electrode active substance for non-aqueous electrolyte secondary batteries as defined in any one of the above Inventions 1 to 3 (Invention 4).

Furthermore, according to the present invention, there is provided a process for producing the positive electrode active substance for non-aqueous electrolyte secondary batteries as defined in any one of the above Inventions 1 to 3, comprising the steps of:

obtaining spherical nickel-cobalt-manganese-based composite compound particles as a raw material;

mixing the composite compound particles with lithium hydroxide such that a molar ratio of Li to a sum of Ni, Co and Mn (Li/(Ni+Co+Mn)) is in the range of 1.00 to 1.20 to obtain a mixture thereof;

calcining the thus obtained mixture at a temperature of 600 to 900° C. in an oxygen-containing atmosphere; and subjecting the calcined product to annealing treatment at a temperature of 500 to 750° C. which is lower than the calcination temperature, without subjecting the calcined product to water-washing treatment (Invention 5).

Advantageous Effects of Invention

The positive electrode active substance according to the present invention is capable of conducting stable charging and discharging operations without significant deterioration in characteristics thereof even when subjecting a non-aqueous electrolyte secondary battery using the positive electrode active substance to repeated charging and discharging cycles, and therefore can be suitably used as a positive electrode active substance for non-aqueous electrolyte secondary batteries.

BRIEF DESCRIPTION OF THE DRAWING

The FIGURE is a conceptual view of measurement of a compositional ratio on a section of a secondary particle.

DESCRIPTION OF EMBODIMENTS

The construction of the present invention is described in more detail below.

The positive electrode active substance according to the present invention has a coefficient of variation of a ratio of a concentration of Li to a transition metal as a main bulk component of not more than 25%, and is in the form of a layered oxide represented by the chemical formula:

$$Li_a(Ni_xCo_yMn_{1-x-y})O_2$$

wherein a is not less than 1.0 and not more than 1.15 ($1.0 \leq a \leq 1.15$); x is more than 0 and less than 1 ($0 < x < 1$); and y is more than 0 and less than 1 ($0 < y < 1$).

The layered oxide having such a crystal structure has a very small Li solid solution range unlike an all proportional solid solution such as, for example, $LiMn_2O_4$ spinel oxides. For this reason, the ratio of Li to the transition element (Me) (Li/Me) in the crystals immediately after synthesized is not largely deviated from 1.0. On the other hand, in the case where a portion having a low transition metal concentration is present inside of respective aggregated behaving particles, it is meant that a grain boundary of the crystals is present in the portion. In the present invention, it has been found that the variation of Li/Me is increased by reduction in concentration of Me in the grain boundary portion and deposition of Li therein, and the object of the present invention is to control the variation of Li/Me to a predetermined range. When the coefficient of variation of Li/Me in the present invention is controlled to not more than 25%, it is shown that the variation of Li/Me is reduced and the deviation of the local composition is suppressed, so that the aggregated particles as a whole exhibit an average composition.

In the preferred composition having the chemical formula of $Li_a(Ni_xCo_yMn_{1-x-y})O_2$, a (Li/Me) is in the range of 1.0 to 1.15; it is more preferred that a is in the range of 1.02 to 1.12, x is in the range of 0.1 to 0.8, y is in the range of 0.1 to 0.4; and it is even more preferred that the abundance ratios of Ni, Co and Mn are identical to each other (i.e., x=1/3, y=1/3), or x is 0.5 (x=0.5) and y is 0.2 (y=0.2).

In addition, the positive electrode active substance according to the present invention may comprise different kinds of elements such as F, Mg, Al, P, Ca, Ti, Y, Sn, Bi, Ce and the like.

The lithium transition metal oxide constituting the positive electrode active substance according to the present invention has a coefficient of variation of Li/Me of not more than 25%, so that it is possible to reduce an initial resistance inside the secondary particles and prevent formation of a resistive component therein during the charging and discharging cycles, whereby occurrence of cracks in the aggregated form during repeated charging and discharging cycles as well as deterioration in the battery performance in association therewith can be prevented. The coefficient of variation of Li/Me in the positive electrode active substance is more preferably not more than 20% and even more preferably not more than 18%. The lower limit of the coefficient of variation of Li/Me is zero except for the case where the ratio Li/Me in the grain boundary is lower than that inside the crystals.

The average secondary particle diameter of the positive electrode active substance according to the present invention is preferably 3.0 to 16 μm. When the upper limit of the average secondary particle diameter of the positive electrode active substance is more than 16 μm, diffusion of Li with the charging and discharging cycles tends to be disturbed, so that input and output powers of the battery tend to be deteriorated. The lower limit of the average secondary particle diameter of the positive electrode active substance according to the present invention is preferably 3.0 μm. When the average secondary particle diameter of the positive electrode active substance is less than 3.0 μm, the interface between the active substance and the electrolyte solution tends to be increased so that undesirable side reactions tend to be caused. The average secondary particle diameter of the positive electrode active substance according to the present invention is more preferably 4.0 to 14 μm.

The average particle diameter (crystallite size) of primary particles of the positive electrode active substance according to the present invention is preferably 100 to 600 nm. When the average primary particle diameter of the positive electrode active substance is more than 600 nm, the secondary particles of the positive electrode active substance tend to be deteriorated in mechanical aggregation strength and thereby tend to suffer from occurrence of cracks in the aggregate. When the lower limit of the average primary particle diameter of the positive electrode active substance is less than 100 nm, the area of the grain boundary inside the secondary aggregated structure tends to be increased, so that the deterioration in battery performance owing to side reactions tend to become predominant. The average primary particle diameter (crystallite size) of the positive electrode active substance according to the present invention is more preferably 150 to 500 nm.

Next, the process for producing the positive electrode active substance according to the present invention is described.

The process for producing the positive electrode active substance according to the present invention is not particularly limited. For example, in the production process of the present invention, first, a mixed sulfuric acid aqueous solution comprising cobalt, nickel and manganese is continuously fed to an aqueous solution whose pH value is adjusted to an optimum value to thereby obtain spherical nickel-cobalt-manganese-based composite compound particles as a raw material. The nickel-cobalt-manganese-based composite compound particles are preferably in the form of a composite hydroxide. Next, the composite compound particles are mixed with lithium hydroxide to obtain a mixture thereof in which a molar ratio of Li to a sum of Ni, Co and Mn (Li/(Ni+Co+Mn)) is in a predetermined range. The thus obtained mixture is calcined at a temperature of 600 to 900° C. in an oxygen-containing atmosphere to produce the positive electrode active substance. Meanwhile, after calcining the mixture, the resulting calcined product is preferably subjected to annealing treatment at a temperature of 500 to 750° C. either while cooling the calcined product or after once cooling the calcined product.

The nickel-cobalt-manganese-based composite compound particles have an average particle diameter (crystallite size) of their primary particles of 100 to 600 nm, an average secondary particle diameter of 3 to 20 μm and a BET specific surface area of 0.2 to 1.0 m$^2$/g.

The molar ratio Li/Me in the aforementioned mixture is preferably 1.00 to 1.20. When the molar ratio Li/Me is less than 1.00, Li tends to be included in an Ni site of the crystal structure, so that the obtained calcined product tends to fail to have a single crystal phase and therefore tends to fail to satisfy a coefficient of variation of Li/Me of not more than 25% in some cases, whereby there tends to occur deterioration in performance of the resulting battery. When the molar ratio Li/Me is more than 1.20, a surplus amount of Li exceeding an amount of Li in a stoichiometric composition of the resulting calcined product tends to form a resistive component therein to thereby cause deterioration in performance of the resulting battery. The molar ratio Li/Me in the aforementioned mixture is more preferably 1.02 to 1.12, and even more preferably 1.05 to 1.08.

The atmosphere used upon calcining the mixture is an oxygen-containing atmosphere. The oxygen content of the oxygen-containing atmosphere is preferably not less than 20% by volume. When the oxygen content of the oxygen-containing atmosphere is less than the aforementioned range, Li ions tend to be included in a transition metal site of the crystal structure in the calcined product, so that the resulting battery tends to be deteriorated in performance thereof. The upper limit of the oxygen content of the oxygen-containing atmosphere is not particularly limited.

The temperature used upon calcining the mixture is preferably 600 to 900° C. When the calcination temperature is lower than 600° C., the resulting calcined product tends to fail to have a crystal structure having the aimed thermal equilibrium conditions and therefore tends to fail to form a single crystal phase owing to shortage of a diffusion energy of elements therein. For this reason, in the aforementioned condition, the resulting positive electrode active substance tends to fail to satisfy a coefficient of variation of Li/Me of not more than 25% in some cases. On the other hand, when the calcination temperature is higher than 900° C., the resulting calcined product tends to suffer from oxygen deficiency in the crystals thereof owing to reduction of the transition metal therein, so that it is not possible to form a single crystal phase having the aimed crystal structure. Therefore, in the aforementioned condition, the resulting positive electrode active substance tends to fail to satisfy a coefficient of variation of Li/Me of not more than 25% in some cases.

In the case where the calcined product is subjected to annealing treatment, the temperature used in the annealing treatment is preferably in the range of 500 to 750° C., and the atmosphere used therein is preferably an oxygen-containing atmosphere. When the annealing temperature is lower than 500° C., surplus lithium present in the grain boundary tends to be hardly diffused into the crystals owing to shortage of a diffusion energy of elements therein, so that it is not possible to achieve the aimed object of reducing the variation of the composition. Therefore, in the aforementioned condition, the resulting positive electrode active substance tends to fail to satisfy a coefficient of variation of Li/Me of not more than 25% in some cases. When the annealing temperature is higher than 750° C., the oxygen tends to be insufficient in activity thereof, and a transition metal oxide having a rock salt-type structure as an impurity phase tends to be produced. For this reason, in the aforementioned condition, the resulting positive electrode active substance tends to fail to satisfy a coefficient of variation of Li/Me of not more than 25% in some cases. The annealing temperature is more preferably 550 to 730° C., and even more preferably 580 to 700° C.

Meanwhile, the annealing temperature is preferably lower than the calcination temperature, and more preferably lower by 30° C. or more than the calcination temperature.

Even in the case where the calcination prior to the annealing treatment is incapable of satisfying a coefficient of variation of Li/Me of not more than 25% owing to the aforementioned various reasons, by subjecting the calcined product to the annealing treatment, it becomes possible to satisfy a coefficient of variation of Li/Me of not more than 25% in some cases.

In the present invention, it is preferred that the calcined product is subjected to no water-washing treatment between the calcination and the annealing treatment. If the the calcined product is subjected to any water-washing treatment before the the annealing treatment, elution of Li from the surface of the secondary particles tends to be caused, so that the variation of the composition of the resulting product tends to be increased.

In the present invention, when the mixture comprising the raw materials at the predetermined compositional ratio is subjected to calcination and heat treatments under the desired conditions, it is possible to obtain a positive electrode active substance having a coefficient of variation of Li/Me of not more than 25%.

Next, the non-aqueous electrolyte secondary battery according to the present invention is described.

The non-aqueous electrolyte secondary battery according to the present invention comprises a positive electrode comprising the aforementioned positive electrode mixture, a negative electrode and an electrolyte. The non-aqueous electrolyte secondary battery according to the present invention can be used even under such a condition that the operation voltage or the voltage in association with an initial crystal phase transition is not more than 4.5 V based on lithium.

Next, the positive electrode mixture according to the present invention is described.

The positive electrode mixture according to the present invention is not particularly limited, and may be obtained, for example, by kneading an active substance, a conducting agent and a binder at a mixing ratio of 90:5:5.

As a negative electrode active substance, there may be used metallic lithium, lithium/aluminum alloys, lithium/tin alloys, silicon, silicon/carbon composite materials, graphite and the like.

In addition, as a solvent for the electrolyte solution, there may be used not only a combination of ethylene carbonate (EC) and diethyl carbonate (DEC), but also an organic solvent comprising at least one compound selected from the group consisting of carbonates comprising propylene carbonate (PC), dimethyl carbonate (DMC), etc., as a basic structure, and ethers such as dimethoxyethane (DME).

As an electrolyte, there may be used a solution prepared by dissolving lithium phosphate hexafluoride ($LiPF_6$) as well as at least one lithium salt such as lithium perchlorate ($LiClO_4$), lithium borate tetrafluoride ($LiBF_4$) and the like in the aforementioned solvent.

<Function>

The important point of the present invention resides in such a fact that the non-aqueous electrolyte secondary battery obtained using the positive electrode active substance according to the present invention is capable of conducting stable charging and discharging operations with less deterioration in capacity thereof when subjected to repeated charging and discharging cycles at a temperature ranging from a low temperature to a high temperature.

In the present invention, it is estimated that when subjecting a lithium transition metal oxide that acts in the form of aggregated secondary particles as a behaving unit to repeated charging and discharging cycles, occurrence of side reactions on the surface of the crystals is suppressed, so that it is possible to prevent deterioration in capacity of the resulting battery. Examples of the side reactions include a reaction between the surplus lithium and fluorine ions in the active substance or the electrolyte solution, a reaction between the surplus lithium and sulfur ions in the electrolyte solution, and further a side reaction occurring owing to growth of an electric double layer caused by high resistance of an Li-deficient phase, etc. As undesirable side effects derived from these side reactions, there may be mentioned delamination of the grain boundary due to side reaction by-products generated in the grain boundary and further deterioration in conductivity within secondary particles as a behaving unit due to the delamination of the grain boundary, decomposition of organic impurities, dissolution and deposition of metal impurities, as well as swelling of the electrode from the macroscopic viewpoint.

In the present invention, it has been found that deposition of the Li component derived from the raw materials on the grain boundary causes a factor for disturbing a long service life of the battery, and special attention has bee paid to a composition of the grain boundary, in particular, surplus Li component therein. As a result, the molar ratio between Li and a transition metal (Li/Me) inside the aggregated secondary particles (on a broken section of the aggregated secondary particles shown in the below-mentioned Examples) is controlled to as uniform a value as possible, so that it is possible to reduce a surplus local Li component. For this reason, the present inventors have estimated that the amount of a resistive component formed on the grain boundary can be reduced, and the resulting battery is capable of conducting stable charging and discharging operations with less deterioration in capacity thereof when subjected to repeated charging and discharging cycles at a temperature ranging from a low temperature to a high temperature.

EXAMPLES

Typical examples of the present invention are described below.

In order to confirm positions of grain boundaries of the crystals as well as determine a crystal structure inside crystal particles in the vicinity of the grain boundaries, the section of the crystals obtained by Ar ion milling method was identified by TEM Image multi-wave interference images at an acceleration voltage of 300 keV and selected area electron diffraction patterns.

The positions of grain boundaries of the crystals as well as the distribution of ions in a section of secondary particles including the grain boundaries were determined by secondary ion mass spectrometry. More concretely, using a secondary ion mass spectrometer "Nano-SIMS50L" manufactured by AMETEK CAMECA, Cs+ ions were accelerated at 8 keV, contracted and converged into a diameter of not more than 100 nm, and irradiated on a cut section to be observed at intervals of 60 nanometers to thereby identify secondary ions emitted from a sample. By using the aforementioned method, the distribution condition of main elements such as Ni including Li having a fine space resolution with the order of 60 to 100 nm was measured.

Meanwhile, the observation surface of the aggregated particles was formed by cutting a positive electrode active substance embedded in a resin by ion milling method. At this time, the diameter of the section to be cut was controlled to at least 3 µm, and the compositional ratio of the active substance was continuously measured along the linear diametrical portion having a length of at least 3 µm from one end of the aggregated particles to the other end thereof to calculate a standard deviation and an average value of the compositional ratio, thereby determining a coefficient of variation (standard deviation/average value) thereof.

FIG. 1 shows a conceptual view of the aforementioned measurement. The positive electrode active substance according to the present invention was in the form of a secondary particle 2 formed by aggregating a number of primary particles (crystal particles) 1. On the observation section of the secondary particle 2 embedded in the resin, a linear portion 3 having a predetermined length was selected, and the compositional ratio thereof was measured along the linear portion 3.

Furthermore, as a supplemental analysis, FIB-SIM image and Ni distribution of the aforementioned Nano-SIMS were previously compared with each other to confirm that the Ni distribution obtained by Nano-SIMS was consistent with actual positions of the grain boundaries.

Similarly, the analysis of the state of the transition metal in the vicinity of the grain boundary, i.e., in the vicinity of the surface of the crystals was carried out using STEM-EELS under the condition that an acceleration voltage was 200 keV, a beam diameter was 0.2 nm, and an electric current for irradiation was 1.00 nA.

A coin cell having a 2032 size was used in the measurement of repeated charging and discharging characteristics of the positive electrode mixture according to the present invention. In the measurement, 100 charging and discharging cycles were carried out at a charging rate of 0.5 C and a discharging rate of 1 C.

The coin cell used for evaluation of the battery was produced as follows. That is, 90% by weight of a composite oxide as positive electrode active substance particles, 6% by weight of carbon black as a conducting material and 4% by weight of polyvinylidene fluoride dissolved in N-methyl pyrrolidone as a binder were mixed with each other, and the resulting mixture was applied onto an Al metal foil and then dried at 110° C. The thus obtained sheets were blanked into 16 mmϕ and then compression-bonded to each other under a pressure of 3.0 t/cm$^2$ to produce a positive electrode used for the evaluation. A metallic lithium foil was used as a negative electrode, and a 1 mol/L LiPF$_6$ solution of a mixed solvent comprising EC and DMC at a volume ratio of 1:2 was used as an electrolyte solution, thereby producing a coin cell having the aforementioned size.

In the measurement of the repeated charging and discharging characteristics, the coin cell was charged at 0.5 C until reaching 4.3 V (CC-CV), and then discharged at 1 C until reaching 3.0 V (CC), and 100 cycles of the charging and discharging operations were repeated to calculate a capacity retention rate of the coin cell. Meanwhile, the aforementioned test was conducted in a thermostat adjusted to 60° C.

Example 1

In a reaction vessel equipped with a blade-type stirrer, a sodium hydroxide aqueous solution having a pH value of 12.0 was prepared, and an ammonia aqueous solution was added dropwise into the sodium hydroxide aqueous solution such that the obtained reaction solution had an ammonia concentration of 0.80 mol/L. Furthermore, a mixed solution comprising cobalt sulfate, nickel sulfate and manganese sulfate was continuously fed to the reaction vessel. During the aforementioned procedure, a sodium hydroxide aqueous solution and an ammonia aqueous solution were continuously fed to the reaction vessel so as to control a pH value of the resulting reaction solution to 12 and an ammonia concentration thereof to 0.8 mol/L, so that the particles in the reaction solution were grown to those having an average secondary particle diameter as aimed, and further by applying a mechanical shear force to the resulting suspension, a precipitate comprising a spherical composite transition metal was obtained.

After completion of the reaction, the thus obtained suspension was taken out from the reaction vessel and washed with water using a filter press, and then the resulting filter cake was dried at 150° C. for 12 hours, thereby obtaining nickel-cobalt-manganese-based compound particles (nickel-cobalt-manganese-based composite hydroxide particles). The thus obtained composite hydroxide and lithium hydroxide monohydrate were mixed with each other such that a molar ratio of Li to a sum of Ni, Co and Mn in the resulting mixture was 1.01 (Li/Ni+Co+Mn=1.01).

The thus obtained mixture was calcined in an oxygen atmosphere at 750° C. for 10 hours. Thereafter, the calcined product was subjected to heat treatment (annealing treatment) at 600° C. for 4 hours and then deaggregated. As a result of ICP analysis, the resulting calcined product had a chemical composition represented by the formula of $Li_{1.00}Ni_{0.5}Co_{0.2}Mn_{0.3}O_2$, an average secondary particle diameter of 10 µm and a primary particle diameter (crystallite size) of 462 nm.

The section of the thus obtained particles was subjected to Nano-SIMS element distribution analysis, so that it was confirmed that a coefficient of variation of Li/Me in the composition including the crystals and grain boundaries was 24.6%.

As a supplemental measurement, using high resolution TEM, multi-wave interference images and selected area electron diffraction patterns as well as STEM-EELS analysis were conducted from the grain boundaries to an inside of the crystals at intervals of 20 nm. As a result, it was confirmed that the crystal structure in the vicinity of the grain boundaries was the same R-3m structure as that of a bulk thereof, and no reduction of the transition metals was caused.

The resulting positive electrode active substance was used to produce a coin cell. As a result of subjecting the thus produced coin cell to the measurement of charging and discharging cycles, the capacity retention rate of the coin cell was 98.7%.

Example 2

The same procedure as in Example 1 was conducted except that the ratio of Ni/Co/Mn was changed to 1.0/1.0/1.0, and a mixture comprising the Li raw material and the transition metal mixed spherical oxide was calcined in an oxygen atmosphere at 750° C. for 10 hours, and then the resulting calcined product was deaggregated to produce positive electrode active substance particles, thereby obtaining a positive electrode active substance.

The section of the thus obtained particles was subjected to Nano-SIMS element distribution analysis, so that it was confirmed that a coefficient of variation of Li/Me in the composition including the crystals and grain boundaries was 18.7%.

As a supplemental measurement, using high resolution TEM, multi-wave interference images and selected area electron diffraction patterns as well as STEM-EELS analysis were conducted from the grain boundaries to an inside of the crystals at intervals of 20 nm. As a result, it was confirmed that the crystal structure in the vicinity of the grain boundaries was the same R-3m structure as that of a bulk thereof, and no reduction of the transition metals was caused.

The resulting positive electrode active substance was used to produce a coin cell. As a result of subjecting the thus produced coin cell to the measurement of charging and discharging cycles, the capacity retention rate of the coin cell was 99.5%.

Example 3

The same procedure as in Example 2 was conducted except that the ratio of Ni/Co/Mn was changed to 1.0/1.0/1.0, and the ratio of Li/Me was changed to 1.00 (Li/Me=1.00), thereby obtaining a positive electrode active substance.

The section of the thus obtained particles was subjected to Nano-SIMS element distribution analysis, so that it was confirmed that a coefficient of variation of Li/Me in the composition including the crystals and grain boundaries was 7.1%.

As a supplemental measurement, using high resolution TEM, multi-wave interference images and selected area electron diffraction patterns as well as STEM-EELS analysis were conducted from the grain boundaries to an inside of the crystals at intervals of 20 nm. As a result, it was confirmed that the crystal structure in the vicinity of the grain boundaries was the same R-3m structure as that of a bulk thereof, and no reduction of the transition metals was caused.

The resulting positive electrode active substance was used to produce a coin cell. As a result of subjecting the thus produced coin cell to the measurement of charging and discharging cycles, the capacity retention rate of the coin cell was 100.3%.

Comparative Example 1

The same procedure as in Example 1 was conducted except that the calcination was conducted in an oxygen atmosphere at 750° C. for 10 hours, and then the resulting calcined product was deaggregated (without being subjected to annealing treatment), thereby obtaining a positive electrode active substance.

The section of the thus obtained particles was subjected to Nano-SIMS element distribution analysis, so that it was confirmed that a coefficient of variation of Li/Me in the composition including the crystals and grain boundaries was 26.1%.

As a supplemental measurement, using high resolution TEM, multi-wave interference images and selected area electron diffraction patterns as well as STEM-EELS analysis were conducted from the grain boundaries to an inside of the crystals at intervals of 20 nm. As a result, it was confirmed that the crystal structure in the vicinity of the grain boundaries was the same R-3m structure as that of a bulk thereof, and no reduction of the transition metals was caused. However, only in the nearest vicinity of the grain boundaries, inclusion of the transition metals into Li sites was recognized, and at the same tine, EELS energy shift suggesting reduction of the transition metals was confirmed.

The resulting positive electrode active substance was used to produce a coin cell. As a result of subjecting the thus produced coin cell to the measurement of charging and discharging cycles, the capacity retention rate of the coin cell was 95.5%.

The coefficient of variation of Li/Me and the charging and discharging characteristics of the resulting positive electrode active substance are shown in Table 1.

TABLE 1

| Examples and Comparative Examples | Coefficient of variation of Li/Me | Average secondary particle diameter (μm) | Crystallite size (nm) | Cycle 101st/1st % |
|---|---|---|---|---|
| Example 1 | 24.6 | 10.4 | 462 | 98.7 |
| Example 2 | 17.6 | 9.5 | 500 | 99.5 |
| Example 3 | 7.1 | 9.13 | 556 | 101.3 |
| Comparative Example 1 | 26.1 | 10.5 | 667 | 95.5 |

From the aforementioned results, it was confirmed that the secondary battery produced using the positive electrode active substance particles according to the present invention was excellent in repeated charging and discharging characteristics and therefore effective as a positive electrode active substance for non-aqueous electrolyte secondary batteries.

INDUSTRIAL APPLICABILITY

The positive electrode active substance particles according to the present invention has a large discharge capacity and is excellent in cycle characteristics, and therefore can be suitably used as positive electrode active substance particles for non-aqueous electrolyte secondary batteries.

EXPLANATION OF REFERENCE NUMERALS

1: Primary particles.
2: Secondary particles.
3: Line as a reference for measuring a compositional ratio.

The invention claimed is:
1. A process for producing a positive electrode active substance comprising lithium transition metal layered oxide having a composition represented by the formula:

$Li_a(Ni_xCo_yMn_{1-x-y})O_2$ 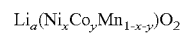

wherein a is 1.0≤a≤1.15; x is 0<x<1; and y is 0<y<1,
in which the positive electrode active substance is in the form of secondary particles formed by aggregating primary particles thereof, and a coefficient of variation of a compositional ratio: Li/Me, wherein Me is a sum of Ni, Co and Mn as measured on a section of the secondary particle is not more than 25%, the process comprising the steps of:
obtaining spherical nickel-cobalt-manganese-based composite compound particles as a raw material;

mixing the composite compound particles with lithium hydroxide such that a molar ratio of Li to a sum of Ni, Co and Mn (Li/(Ni+Co+Mn)) is in the range of 1.00 to 1.20 to obtain a mixture;

calcining the mixture at a temperature of 600 to 900° C. in an oxygen-containing atmosphere to obtain a calcined product; and subjecting the calcined product to annealing at a temperature of 500 to 750° C. which is lower than the calcination temperature, without subjecting the calcined product to water washing treatment, wherein the annealing step is conducted while cooling the calcined product or after once cooling the calcined product.

2. The process according to claim 1, wherein an average secondary particle diameter of the active substance is 3.0 to 16 μm.

3. The process according to claim 1, wherein an average particle diameter of primary particles of the active substance is 100 to 600 nm.

4. The process according to claim 2, wherein an average particle diameter of primary particles of the active substance is 100 to 600 nm.

5. The process according to claim 1, wherein the annealing is conducted while cooling the calcined product.

6. The process according to claim 1, wherein the annealing is conducted after once cooling the calcined product.

* * * * *